United States Patent [19]
Gupta

[11] Patent Number: 5,408,922
[45] Date of Patent: Apr. 25, 1995

[54] AUTOMATIC FOOD PROCESSOR

[76] Inventor: Rajendra P. Gupta, 9 Veery Lane, Ottawa, Ontario, Canada, K1J 8X4

[21] Appl. No.: 71,855

[22] Filed: Jun. 7, 1993

[51] Int. Cl.⁶ .......................... A23C 3/02; A23J 1/00; A23L 1/20
[52] U.S. Cl. ...................................... 99/483; 99/348; 99/353; 99/458; 99/511
[58] Field of Search .................................. 99/325–327, 99/331–333, 348, 353, 452, 453, 456, 458, 483, 485, 486, 489, 511–513; 366/55, 273, 274, 220, 232, 234; 241/36, 46.02, 46.06, 65, DIG. 14; 426/598, 523, 518, 508; 210/360.1, 380.1

[56] References Cited

U.S. PATENT DOCUMENTS 5,074,201 12/1991 Takeyama et al. .................... 99/483

Primary Examiner—Timothy F. Simone

[57] ABSTRACT

An automatic food processor for producing an aqueous extract of protein and oil containing seeds is disclosed. The processor includes a cooking facility as well as seed griding mill and a screened filter. In one embodiment the filter is a centrifuge screen. The processor allows airless griding of seeds, thus ensuring an oxygen-free environment for seed disintegration to produce an aqueous extract which has no off-flavor, bitterness or chalkiness.

8 Claims, 2 Drawing Sheets

AUTOMATIC FOOD PROCESSOR

FIELD OF THE INVENTION

The present invention generally relates to apparatus for producing aqueous extracts of soya beans and other high protein seeds. The invention is directed more specifically to automated equipment for making soya bean milk or other aqueous extracts without the objectionable beany off-flavours, bitterness, or chalkiness.

BACKGROUND OF THE INVENTION

Aqueous extracts of many plant seeds, such as soya beans, sunflower, peanut, cotton-seed, safflower, and sesame, are rich in protein and can be used as replacement of animal or human milk in many applications. The artificial milk made from soya beans has long been recognized as an inexpensive and healthy alternative to dairy milk. However, it has not been popular outside the Orient due to the objectionable beany flavour it has when made using traditional Oriental method.

Several methods have been developed to get rid of the beany flavour. When the seed is broken to extract protein and oil, the reaction of water, oxygen, and oils catalysed by lipoxygenase enzyme results in the formation of certain volatiles having foul odour. Most methods recognise lipoxygenase enzyme as the culprit and attempt to deactivate it by heat treatment or pH control of the aqueous medium of seed disintegration. The heat treatment of the seeds in these methods is done prior to or during the seed disintegration. However, the lipoxygenase enzyme being a protein, its deactivation results in the denaturing of other proteins in the seed. The extracted solids in water are thus not well dissolved and result in chalky mouth-feel and low product yield. Expensive processing is therefore required to make the product palatable.

One recent method taught in U.S. Pat. No. 4,915,972, Apr. 10, 1990 (Gupta et al) entirely depends on reducing the free oxygen to a few parts per million level in the disintegrating environment for eliminating the development of off-flavour. The enzyme is not deactivated by heat treatment until well after the seed solids are extracted in the aqueous medium. As a result the product has no chalky mouth-feel and the product yield is high. The present invention uses this method and is directed to a device to automatically make aqueous extracts of high protein seeds. The steps of grinding seeds in the aqueous medium, cooking the seed slurry, and separating aqueous the extract from undissolved solids are all accomplished automatically in a single vessel.

U.S. Pat. No. 4,744,524 May 17, 1988 (Gupta) describes a grinder/cooker that does the airless grinding and cooking of soy beans in a single vessel. It uses a process of grinding soy beans in oxygen-free environment and produces slurry of ground soy beans. Soy milk is extracted separately from the slurry.

OBJECTS OF THE INVENTION

It is therefore an object of the present invention to provide an automated equipment which is simple to operate for the household production of artificial milk from high protein seeds.

It is another object of the present invention to provide an automated equipment which produces artificial milk without off-flavour, chalkiness, or bitterness.

It is a further object of the present invention to provide a device which performs grinding, cooking and extracting of artificial milk in a single vessel.

BRIEF DESCRIPTION OF THE DRAWINGS

In a more complete understanding of the present invention and to describe further objects and advantages thereof, references may be made to the following description taken in conjunction with the accompanying drawings in which.

SUMMARY OF THE INVENTION

Briefly stated, the present invention is directed to an automatic food processor for producing soymilk from soybeans in oxygen-free environment. The processor includes a vessel to hold water and a screened container positioned in the vessel to be totally immersed in water therein and having a removable lid to hold soybeans therein. It further has a rotatable mill located in the screened container near the bottom and an electric motor provided outside the vessel. A transmission mechanism is also provided to mechanically connect the mill and the electric motor through the vessel and the screened container to operate the mill to crush, in oxygen-free environment, the soybeans which are held in the screened container. A heater is provided attached to the vessel to heat the content of the vessel. A spigot on the vessel removes the soymilk from the vessel.

DETAILED DESCRIPTION OF THE PREFERRED EMBODIMENTS OF THE INVENTION

Figure 1:
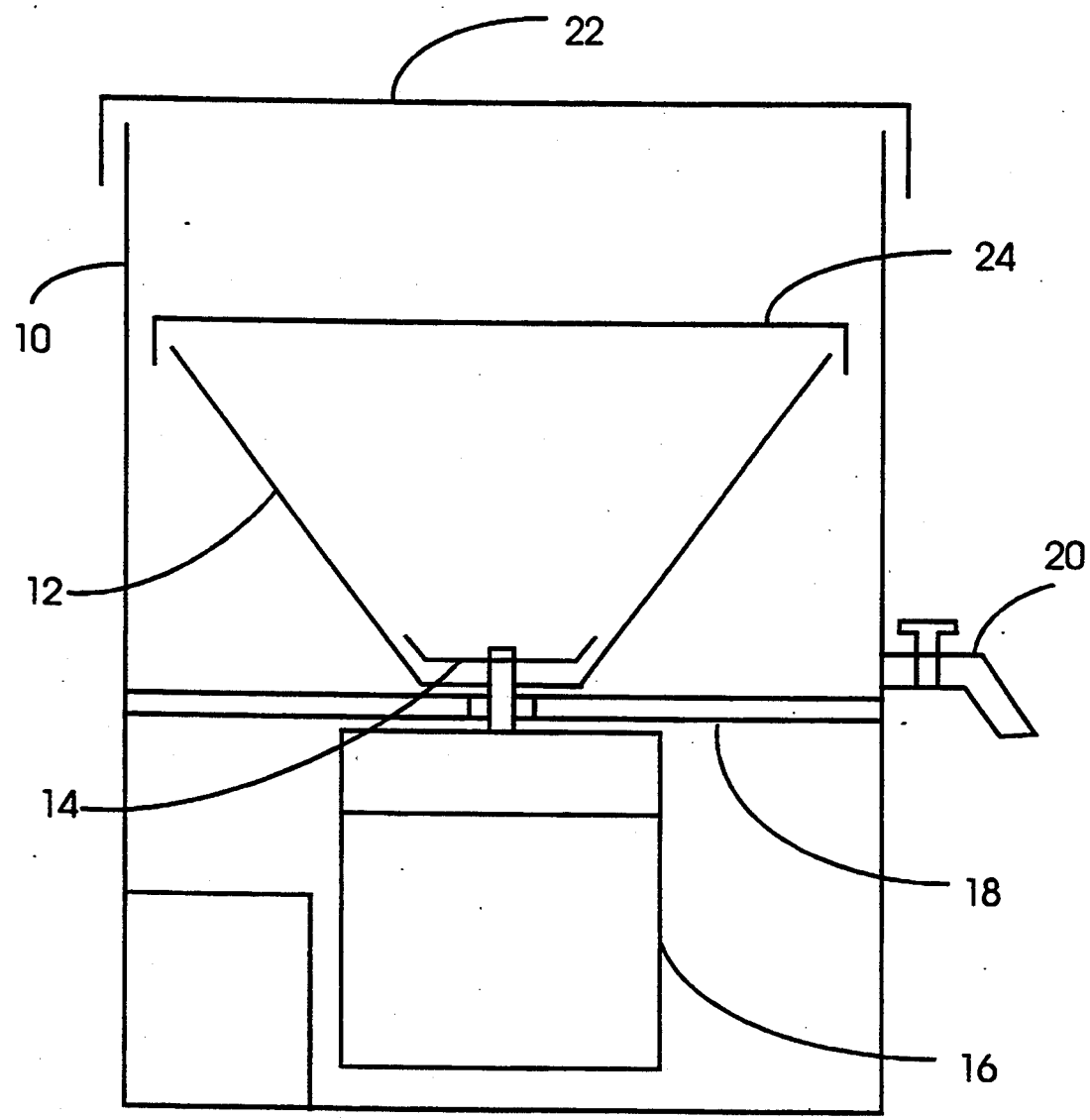
FIG. 1 is a schematic illustration of an automated device according to one embodiment of the invention.

FIG. 1 shows an embodiment of the invention in which properly cooked aqueous extract of soya beans and the like high protein seeds is the output of the equipment. The equipment includes a vessel 10 in which water is to be held. In the vessel a centrifuge screen 12 and cutter blade 14 are provided. Both the centrifuge screen and the cutter blade are connected to an electric motor contained in a motor housing 16 preferably through some transmission mechanism so that the centrifuge and cutter can be driven at proper speeds and in proper directions. A heating plate 18 at the bottom of the vessel cooks its contents. A spigot 20 draws the milk form the vessel. Though not shown in the figure, the motor housing further contains a control which ensures proper operations of the motor and the heating plate. Lids 22 and 24 are provided on the vessel and the centrifuge screen. The vessel and its lid in one embodiment can be made to withstand pressure to form a pressure cooker. The centrifuge screen and the cutter blade are removable from the transmission mechanism.

The operation of the equipment is simple. Steeped or dry seeds, adequately cleaned and washed, are put into the equipment vessel 10 inside the centrifuge screen 12 by removing the vessel lid 22 and the screen lid 24. Water is added to the extent that its level reaches above the screen lid. This prevents the formation of vortex and concomitant mixing of air when the seed are ground. Optionally, baking soda, salt, sweetener, and other taste enhancers are added. The screen lid 24 and the vessel lid 22 are then replaced. If the dry seed are used then the seeds are allowed to steep for a preset time. Water is heated to a preset temperature by applying surface heat through the heating plate 18 to reduce the seed steeping time. The cutter blade 14 is then rotated at high speed to fine grind the seeds.

The heat is applied through the heating plate 18 to adequately cook the contents of the vessel 10. The temperature and duration of cooking depend on the seeds used and whether or not the vessel 10 can be pressurized. In an unpressurized vessel the temperature is raised close to the boiling point and held at the level for 30 minutes or longer when making soya bean milk. In a pressurized vessel, the temperature is typically raised to 110° C. and held at that temperature for 5 minutes. If the temperature is raised to the desired level over a significant time then the holding time is reduced. The adequate cooking is needed to denature the antinutrient factors, such as trypsin inhibitor in soya beans.

The spigot 20 is opened to remove the seed milk from the vessel. Since the fibrous soya bean residue (okara) has a lot of soy milk entrapped in it, the motor is run to drive the centrifuge and extract this soy milk when soy milk stops coming out from the spigot. The residue remaining inside the centrifuge screen is emptied by removing the cutter blade centrifuge assembly from the vessel.

Some or all of the operations can be automated using a temperature sensor and a timer, either electromechanical or microprocessor based, such as in a household bread maker.

The equipment eliminates free oxygen from the bean grinding environment by grinding soya beans in water without mixing any air, cooks the resulting slurry, and extracts soya bean milk with a centrifuge. The milk made by the equipment is free from beany off-flavour. chalkiness, or bitterness. All the three operations are built in a single vessel. The operations are timed, sensed, and switched automatically such that a user intervention is not required from start to finish. The equipment can be simplified to be semiautomatic or manual to reduce cost, and scaled up to be useful for commercial, industrial, and institutional production.

The equipment can be used for extracting juice of fruits and vegetables as well as for making soups and other foods. The equipment intended for commercial, institutional, or industrial use requires a quick heating of the vessel contents. The heating plate in such equipment is replaced by a steam infusion device. Also, the cutter blade is replaced by a hammer mill assembly.

In another embodiment of the machine, the centrifuge extractor is replaced with a mechanical or hydraulic or screw press to squeeze the fibrous residue either in the body of the machine or externally. Alternatively, the squeezing operation is ignored and the user is satisfied with a lower product yield.

The centrifuge screen shown in FIG. 1 is a section of a cone. Instead it could be cylindrical or of another shape. The equipment may also be made taller or wider than shown in the figure.

Figure 2:
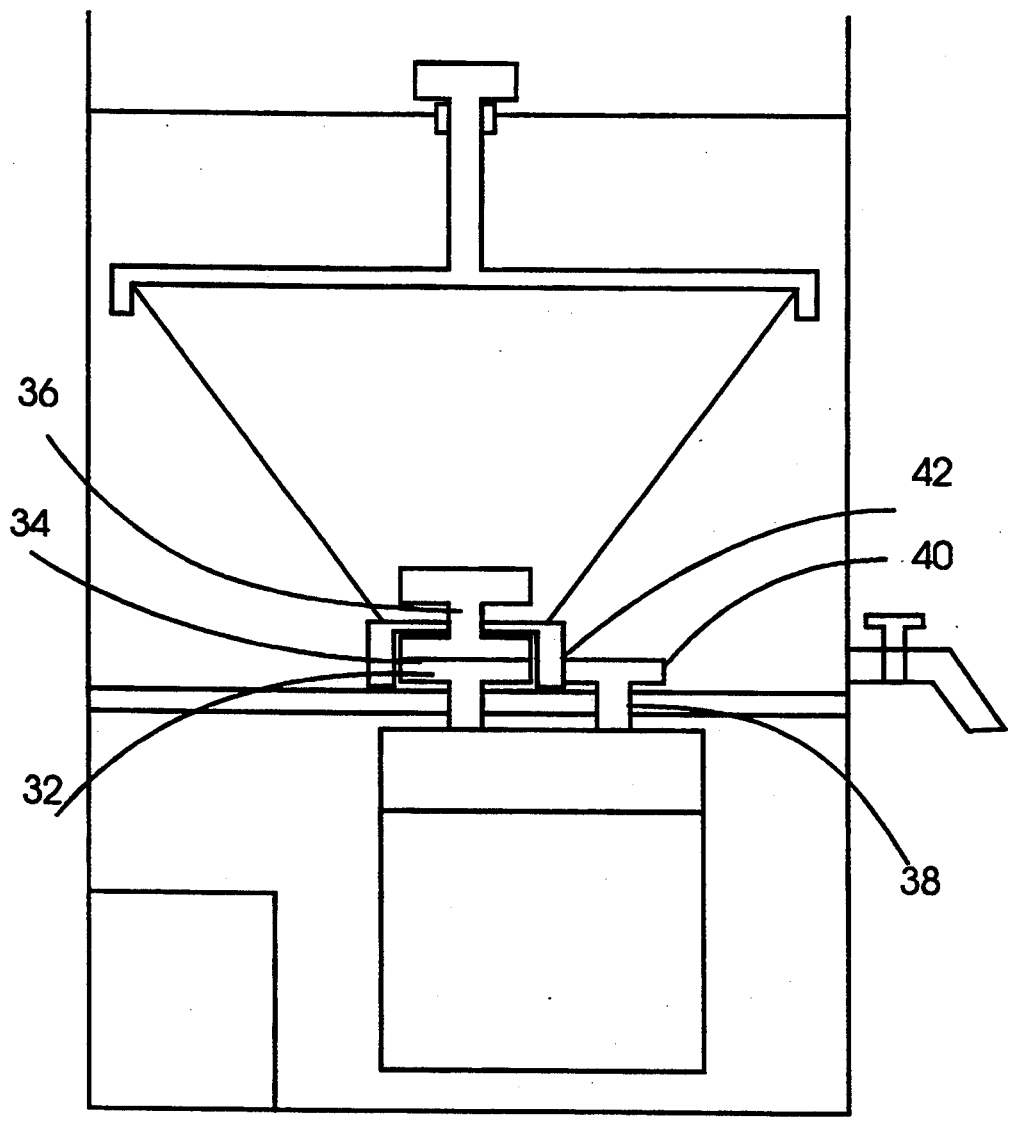
FIG. 2 is a schematic illustration of an automated device according to another embodiment of the invention.

FIG. 2 shows one arrangement of the detachable centrifuge and the cutter blade. The drive shaft 32 has a surface 34 mating with the bottom surface of the cutter blade shaft 36. Another drive shaft 38 has gears 40 which couple to the gears 42 on the base of the centrifuge screen. The rotations of the drive shafts by a motor result in the rotations of the cutter blade and the centrifuge screen. The transmission mechanism can be made of a collection of gears to drive the centrifuge screen and the cutter blade at desired speeds and in desired directions. If the cutter blade and the screen are rotated in opposite directions, then the cutter blade is run to grind the beans for 3 to 5 minutes only. The axial support is to stabilize the rotation of the centrifuge screen but is optional.

It may be useful to have vessel made of aluminum coated with teflon. Very even heat need to be applied, otherwise scorching of soy milk in the vessel might occur.

For cleaning, the vessel lid is removed and the screen enclosure, which has cutter blade and the drive gear attached to it at the bottom, is taken out. The okara is emptied in a container, and the vessel and the screen are washed thoroughly.

I claim:

1. An automatic food processor for producing soymilk from soybeans in oxygen-free environment comprising:
   a vessel to hold water,
   a screened container positioned in the vessel to be totally immersed in water therein having a removable lid to hold soybeans therein,
   a rotatable mill located in the screened container near the bottom,
   an electric motor provided on the outside of the vessel,
   a transmission mechanism mechanically connecting the mill and the electric motor through the vessel and the screened container to operate the mill to crush, in oxygen-free environment, the soybeans which are held in the screened container,
   a heater provided attached to the vessel to heat the content of the vessel, and
   a spigot on the vessel to remove the soymilk therefrom.

2. The automatic food processor for producing soymilk from soybeans in oxygen-free environment, according to claim 1, wherein the screened container is connected to the transmission mechanism so that the screened container can be rotated to function as a centrifuge.

3. The automatic food processor for producing soymilk from soybeans in oxygen-free environment, according to claim 2, wherein the screened container and the mill are detachable from the transmission mechanism.

4. The automatic food processor for producing soymilk from soybeans in oxygen-free environment, according to claim 1, wherein the vessel includes a lid thereon, and the vessel and the lid being strong enough to withstand the raised pressure therein.

5. The automatic food processor for producing soymilk from soybeans in oxygen-free environment, according to claim 3, wherein the transmission mechanism connect either the screened container or the mill separately.

6. The automatic food processor for producing soymilk from soybeans in oxygen-free environment, according to claim 5, further comprising an electrical control including a timer and a temperature sensor to control the operation of the motor and the heater.

7. The automatic food processor for producing soymilk from soybeans in oxygen-free environment, comprising:
   a pressurisable vessel having a lid to hold water therein,
   a centrifuge screen located in the vessel and to be totally immersed in water contained in the vessel, the centrifuge screen having a lid to hold soybeans therein and a first shaft by which the centrifuge screen is rotatable about a vertical axis,
a cutter blade in the centrifuge screen having a second shaft to rotate the cutter blade,
an electric motor provided outside the vessel,
a transmission mechanism connecting the first and second shafts with the electric motor to operate the centrifuge screen and the cutter blade to, crush, in oxygen free environment, the soybeans held in the centrifuge screen,
a heater plate attached to the vessel to heat the content of the vessel, and
a spigot on the vessel to remove the soymilk.

8. The automatic food processor according to claims 1 or 7 wherein soybeans are substituted with any edible product and soymilk is substituted with aqueous extract.

* * * * *